United States Patent [19]
Lokka

[11] 3,809,037
[45] May 7, 1974

[54] VALVE FOR INTRODUCTION OF ADDITIONAL AIR INTO INTERNAL COMBUSTION ENGINES

[76] Inventor: Jens Leif Lokka, Haerland, Mysen, Norway

[22] Filed: July 20, 1972

[21] Appl. No.: 273,469

[30] Foreign Application Priority Data
Oct. 11, 1971 Norway................................ 3724/71

[52] U.S. Cl......... 123/119 DB, 123/124 R, 137/480, 137/514
[51] Int. Cl............................................ F02m 23/08
[58] Field of Search........ 137/480, 514; 123/119 D, 123/124 R, 119 DB; 91/396; 92/143, 162

[56] References Cited
UNITED STATES PATENTS
| | | | |
|---|---|---|---|
| 1,239,639 | 9/1917 | Torrens | 137/480 |
| 1,630,362 | 5/1927 | Sutton | 137/480 X |
| 2,021,337 | 11/1935 | Trefz | 137/480 |
| 2,970,546 | 2/1961 | White | 92/162 RX |
| 3,659,575 | 5/1972 | Lokka | 123/124 R |

FOREIGN PATENTS OR APPLICATIONS
393,380 12/1908 France................................ 123/124
1,938,884 2/1970 Germany............................ 123/124

*Primary Examiner*—Charles J. Myhre
*Assistant Examiner*—William Rutledge, Jr.

[57] ABSTRACT

A valve controlled by the vacuum in the manifold of an internal combustion engine, has a valve body, the stem of which extends through an opening in the valve seat and down into a liquid-filled chamber, and a spring and a weight loading the valve, the weight being located in a constricted portion of the liquid-filled chamber so that the internal wall of said chamber and the weight define a narrow passage forming a damping device. Disclosed is an embodiment wherein the liquid-filled chamber is tapered in a direction away from the valve body, and the weight is capable of being raised or lowered on the valve stem, whereby the damping action is thus varied by the position of the weight on the stem. The valve is used to reduce the vacuum in the induction manifold of an engine and to supply additional air to the engine.

2 Claims, 1 Drawing Figure

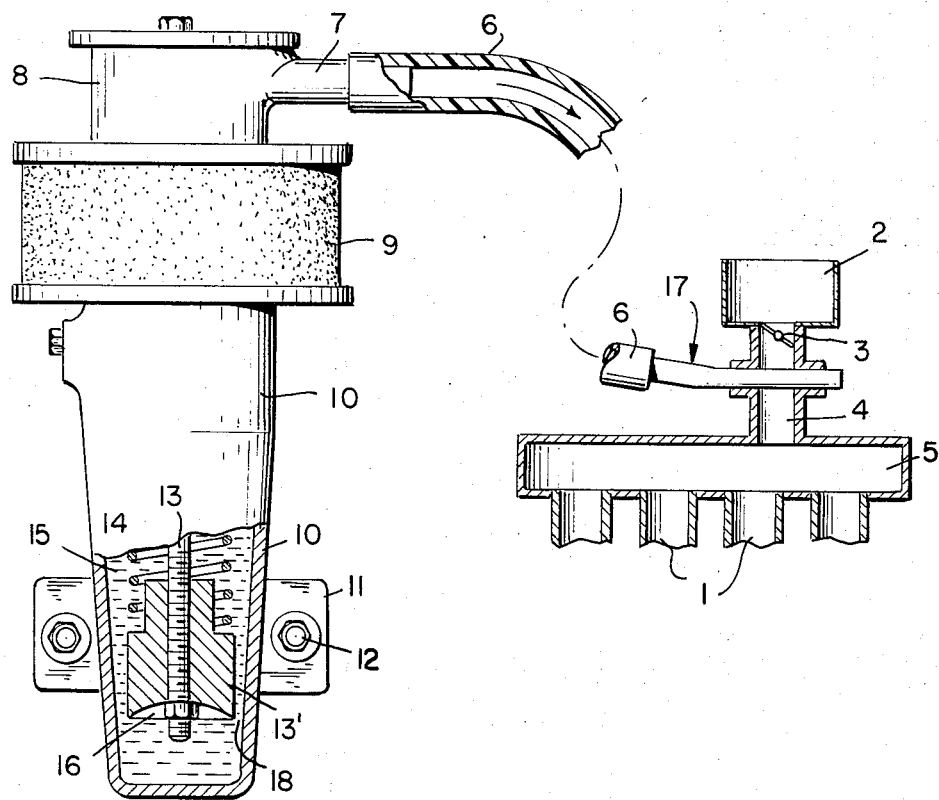

VALVE FOR INTRODUCTION OF ADDITIONAL AIR INTO INTERNAL COMBUSTION ENGINES

The present invention relates to an arrangement in a valve for introduction of additional air into the conduit leading from the carburetor of an internal combustion engine to the intake manifold of same.

Such a valve is controlled by the vacuum in the manifold and comprises a valve housing having a valve body, the stem of which extends through an opening in the valve seat and down into a liquid-filled chamber, and is loaded by a spring and a weight and is provided with a damping means which damps the movement of the valve body under the action of the vacuum in the manifold. A valve of this kind is described in my earlier filed application Ser. No. 87,686, filed Nov. 9, 1970, now U.S. Pat. 3,659,575, issued May 2, 1972, which is hereby incorporated herein by reference, according to which the damping means consists of a disc arranged above the weight and which defines, together with the liquid-filled chamber, an annular passage in which turbulent currents in the liquid are created due to the movements of the valve body.

It is the object of the present invention to obtain a simplified and improved, adjustable damping action in valves of this type.

This object is accomplished by providing the weight in a constricted portion of the liquid-filled chamber so that the weight and the wall of the chamber define a narrow annular passage forming the damping means.

Preferably, the liquid-filled chamber is tapered in a downward direction, so that the damping action may be varied by the weight being raised or lowered on the valve stem.

In a further preferred embodiment of the invention, the damping action of the liquid may be increased, and simultaneously a delayed closing action during the downward movement of the valve body towards the valve seat during decreasing pressure in the manifold is obtained, by providing the lower end of the weight with a recess.

The invention is illustrated by the drawing which shows a valve which supplies additional air to the manifold of an internal combustion engine. The engine is schematically indicated by four cylinders 1, the manifold 5 of which via a supply tube 4 is supplied with a gasoline/air mixture from the carburetor 2. The pedal-controlled flap valve 3 of said carburetor 2 is located in the supply tube 4. Between the flanges of said tube 4 is a disc-shaped air-introducing device 17 which, via a flexible hose 6 and a tube stud 7 is connected with a valve housing 8, the valve body of which is not shown. The valve is controlled by the vacuum in the manifold 5 and the supply tube 4 via one or more openings (not shown) in the disc-shaped device 17.

When the valve is opened as a consequence of the vacuum in the manifold 5, the valve stem 13 and weight 13' will rise against the force of spring 14 and air will be sucked in through filter 9. The air will pass through the valve and hose 6 to the air-introduction device 17 and thence into tube 4 and manifold 5. Below said filter 9 there is a container 10 provided with a bracket 11 for mounting the valve to one of the walls of the motor housing by means of screws 12. The lower portion of container 10 forms a chamber 15 which contains a relatively viscous liquid, such as oil, down into which chamber the stem 13 of the valve body extends. On the lower end of the valve stem 13 there is screwed a weight 13' which is formed with a shoulder forming a seat for a spring 14. The spring 14 and weight 13' together with the valve body (not shown) and its stem 13 form the load of the valve. The spring constant of the spring 14 is preferably so chosen that the weight 13' is greater than the force of the spring 14. My earlier application Ser. No. 87,686 discloses a suitably dimensioned valve.

The liquid-filled chamber 15 is tapered in the downward direction so that the internal wall of chamber 15 and the weight 13' form an annular constriction 18 therebetween which operates as a damping means. As a consequence of the tapered form of the chamber 15, the size of annular passage 18 between the chamber wall and the weight may be changed to adjust the damping action by raising or lowering the weight. In order to increase said damping action and, simultaneously, obtain a delayed closing of the valve during the downward movement of the valve body, the lower end of said weight 13' is formed with a concave recess 16, in which the liquid of chamber 15 will be backed up.

I claim:

1. In a valve for the introduction of additional air into the intake manifold of an internal combustion engine, said valve being controlled by the vacuum in the manifold and comprising an elongated valve housing, a valve body and a valve seat in the housing, a valve stem depending from the valve body through an opening in the valve seat into a liquid-filled chamber below said valve body and valve seat, a spring and a weight loading said valve, and means for damping the movement of the valve body under the action of the vacuum in the manifold, the improvement wherein the liquid-filled chamber is tapered in a direction away from said valve body, said weight and the internal wall of said chamber forming a narrow annular passage constituting the damping means, and the weight is capable of being raised or lowered on the valve stem, whereby the damping action may be varied by the position of the weight on the stem.

2. Apparatus according to claim 1, wherein the lower end of said weight is provided with a recess, whereby the damping action is increased and a delayed action of the closing movement of the valve body is obtained.

* * * * *